(12) United States Patent
Mutou et al.

(10) Patent No.: US 6,714,225 B2
(45) Date of Patent: Mar. 30, 2004

(54) IMAGE FORMATION APPARATUS AND IMAGE FORMATION METHOD

(75) Inventors: Yoshinori Mutou, Yamatokoriyama (JP); Tetsuro Toyoshima, Soraku-gun (JP); Tadashi Iwamatsu, Nara (JP); Nobuyuki Azuma, Ikeda (JP); Yoshinori Nakajima, Joyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/213,427

(22) Filed: Aug. 6, 2002

(65) Prior Publication Data

US 2003/0122917 A1 Jul. 3, 2003

(30) Foreign Application Priority Data

Aug. 9, 2001 (JP) ......................................... 2001-242687

(51) Int. Cl.[7] .......................... B04J 2/385; G03G 13/04
(52) U.S. Cl. ........................ 347/131; 347/254; 358/3.06
(58) Field of Search ................................. 347/129, 130, 347/131, 132, 254; 358/3.06

(56) References Cited

U.S. PATENT DOCUMENTS

| 4,816,863 A | * | 3/1989 | Lee | 347/129 |
| 6,088,050 A | * | 7/2000 | Ng | |
| 2002/0067511 A1 | * | 6/2002 | Fujita | 358/3.06 |

FOREIGN PATENT DOCUMENTS

| JP | 61005676 A | 1/1986 |
| JP | 02039957 A | 2/1990 |

\* cited by examiner

*Primary Examiner*—Susan S. Y. Lee
(74) *Attorney, Agent, or Firm*—David G. Conlin; William J. Daley, Jr.; Edward & Angell LLP

(57) ABSTRACT

When a halftone image region that is below a predetermined density is to be reproduced, a processing unit controlling an exposure unit selects an exposure pattern that can represent a record dot diameter within a range based on a predetermined rule from exposure patterns prepared in advance. Accordingly, graininess is suppressed. When there are a plurality of exposure patterns that can be applied, the exposure pattern with the lowest number of dots present per 1 inch is employed. Accordingly, a halftone image is formed with the image reproducibility improved.

10 Claims, 6 Drawing Sheets

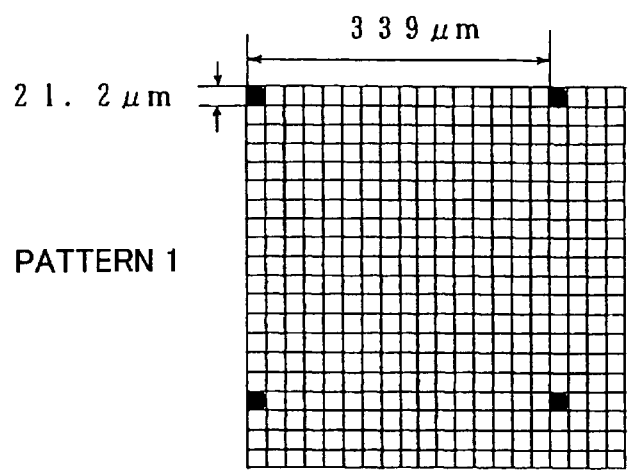
FIG.3A PATTERN 1
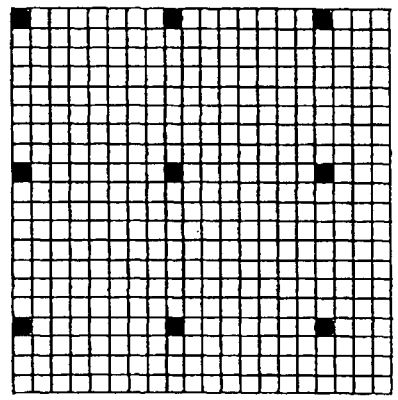
FIG.3B PATTERN 2
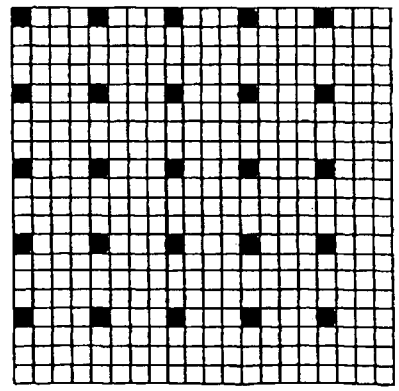
FIG.3C PATTERN 3

IMAGE FORMATION APPARATUS AND IMAGE FORMATION METHOD

BACKGROUND OF THE INVENTION

1. Field of the Invention

The present invention relates to an image formation apparatus and method to form an image through electrophotography based on digital image information. Particularly, the present invention relates to an image formation apparatus and method forming a halftone image through exposure energy modulation.

2. Description of the Background Art

As to the output image of an image output equipment utilizing electrophotography such as a digital copy machine or printer, one continuing goal is to improve the picture quality of high definition close to that of a silver halide photograph. Essential requirements to realize a picture quality equal to that of a photograph includes quite a little gray scale levels to represent a halftone image, increase in the number of gray levels particularly in the low density region (improvement of the tone resolution), improvement in reproducibility, reduction in graininess (asperity in image) and the like. It is expected that a halftone image of good quality having a smooth gray scale property can be realized by meeting the above requirements.

Various conventional methods in tone rendition are known, including the bi-tonal recording system such as the dither method, density pattern method and error diffusion method, as well as the multilevel recording system such as the laser intensity modulation method and laser pulse width modulation method.

The dither method which is one of the gray scale reproduction technique compares a threshold value calculated at a predetermined rule for each pixel with the multiple gray level of an input pixel within a dither matrix formed of a plurality of pixels in an input image to determine black and white.

The density pattern method reproduces the gray scale by setting one pixel in the input image to correspond to a matrix of n×n pixels, and control the number of pixels to be printed out in the matrix according to the density level of each pixel in the input image.

All of these methods are characterized in that the number of gray levels that can be reproduced is increased by setting a larger matrix size. These methods are particularly suitable to improve the gray scale reproducibility in a low density region.

However, these methods have the disadvantage that the output resolution will be degraded by increasing the matrix size. Therefore, minimizing reduction in the output resolution in addition to maintaining favorable gray scale reproduction in the low density region have been the conventional issues.

In view of these issues, Japanese Patent Laying-Open No. 61-5676, for example, discloses the approach of preparing a plurality of matrix patterns that have a larger matrix size in proportion to a lower level of the multiple gray level to enable recording of a low density region without degrading the resolution.

According to the art disclosed in this publication, the distance between adjacent dots can be increased by using a large-sized matrix at the low density region, whereby the apparent density can be reduced. At the high density region, the matrix size is set smaller. Therefore, the output resolution can be maintained.

However, the method disclosed in Japanese Patent Laying-Open No. 61-5676 cannot provide subtle density control as compared to the method of controlling the size of one dot through exposure energy modulation. Therefore, the number of gray levels that can be reproduced is limited. It was difficult to obtain a smooth gray scale rendition at a low density area where small dots are required.

Even if the low density area can be reproduced by forming dots of relative large size to take a large matrix size, graininess was exhibited in some cases depending upon the dot diameter. There was a possibility that the picture quality is adversely degraded.

Japanese Patent Laying-Open No. 2-39957 discloses the technique of recording an image of wide gray scale width without degrading the resolution by altering the recording dot size and dot pattern. According to this method, an image of a low density region that could not be achieved by just altering the dot diameter can be realized.

However, the method disclosed in Japanese Patent Laying-Open No. 2-39957 has no restriction in the dot diameter. In the case where a pattern of few dots directed to represent a low density area among the various pixel patterns is applied, it is expected that significant graininess will be exhibited when a certain dot size is exceeded. In such a case, the picture quality of the output image will be eventually degraded.

SUMMARY OF THE INVENTION

An object of the present invention is to provide an image formation apparatus and image formation method that can have graininess that depends upon the correlation between the dot-dot distance and dot diameter reduced to realize a favorable gray scale rendition particularly in the low density region.

According to an aspect of the present invention, an image formation apparatus includes an exposure unit, a development unit, a storage unit, and a processing unit.

The exposure unit applies a laser beam on a photoconductor charged to a predetermined potential at a predetermined polarity to form an electrostatic latent image. The development unit renders the electrostatic latent image visible by applying the developer electrostatically. The storage unit prestores a plurality of exposure patterns having dots scattered and arranged with the distance between adjacent dots set constant in both the main scanning direction and the subscanning direction, a first table in which the density range that can be reproduced by each exposure pattern is stored, and a second table indicating the correlation between the dot diameter and output density of each exposure pattern. The processing unit provides control of the exposure unit when a halftone image region that is below a predetermined density is to be reduced. In reproducing a halftone image region that is below a predetermined density, the processing unit i) selects an exposure pattern corresponding to an input density value by referring to the first table, ii) in the case where a plurality of exposure patterns are selected for the input density value, deriving the dot diameter required for each of the plurality of exposure patterns by referring to the second table, and selecting an exposure pattern that satisfies the relation of $D/N \leq 0.4$ where D is the dot diameter and N is the number of dots present per 1 inch for each of the plurality of exposure patterns, and iii) controlling the exposure unit using the selected exposure pattern.

In the operation of reproducing a halftone image region that is below a predetermined density, an optimum exposure pattern that allows favorable reproducibility without graininess in the output image can be selected from a plurality of exposure patterns having dots scattered and arranged with the distance between adjacent dots set constant in both the main scanning direction and subscanning direction.

Preferably, the processing unit functions to select an exposure pattern that has the lowest dot count N per 1 inch when there are a plurality of exposure patterns that satisfies the relation.

Since the selected exposure pattern has a large required dot diameter, variation in the dot diameter in forming the exposure pattern can be suppressed to a low level. In other words, dots can be formed in superior reproducibility and stably.

Preferably, the number of dots N present per 1 inch in the exposure pattern that has the largest distance between adjacent dots satisfies the relation of $75 \leq N \leq 150$ among the plurality of exposure patterns.

By employing an exposure pattern satisfying the relationship of $75 \leq N \leq 150$ where N is the dot count per 1 inch for an image region of extremely low density, a halftone image suppressed in graininess and of favorable reproducibility can be formed.

Preferably, the image formation apparatus reproduces the gray scale by a combination of the exposure pattern and dot diameter control through exposure energy modulation. The storage unit also stores a third table that indicates the correlation between an exposure energy and a dot diameter. The processing unit derives the required dot diameter in the determined exposure pattern by referring to the second table for the image density level of each pixel forming the halftone image region. The processing unit includes an exposure energy density determination unit deriving the exposure energy required to obtain the derived dot diameter by referring to the third table. The image formation apparatus further includes a laser driver that effects exposure so as to obtain the desired output density by controlling the exposure unit based on the determined exposure pattern and exposure energy.

By controlling the exposure energy quantitatively based on the second table storing the correlation between the dot diameter and output density for each of the plurality of exposure patterns and the third table storing the correlation between the exposure energy and the dot diameter, the desired density can be reproduced at favorable accuracy by any of the exposure pattern.

Preferably, the exposure energy modulation is the pulse width modulation controlling the pulse width of the laser drive pulse for each dot.

By supplying the drive pulse having the pulse width controlled according to the required exposure energy density to the light source, the light source can be driven at a drive energy optimal to the dots that form the halftone image. Since the optimum exposure energy can be applied to the dots, favorable dot reproducibility can be achieved.

Preferably, the exposure energy modulation is the intensity modulation controlling the applied energy for each dot.

By supplying a drive pulse having the input energy controlled according to the required exposure energy density to the light source, the light source can be driven at a drive energy optimal to the dots that form the halftone image. Since the optimum exposure energy can be applied to the dots, favorable dot reproducibility is achieved.

According to another aspect of the present invention, an image formation method of gray scale rendition includes the steps of: obtaining the density value of a pixel of interest, comparing the density value with a predefined density value; selecting an exposure pattern corresponding to the input density value by referring to a first table prestored with the density range that can be reproduced by each of a plurality of predetermined exposure patterns when reproducing a halftone image region that is below a predetermined density; deriving a dot diameter required for each of the plurality of exposure patterns by referring to a second table indicating the correlation between the dot diameter and output density of each exposure pattern when a plurality of exposure patterns are selected for the input density value; and selecting an exposure pattern satisfying the relation of $D/N \leq 0.4$ where D is the derived dot diameter and N is the number of dots present per 1 inch.

In reproducing a halftone image region that is below a predetermined density, the first table stored with the density range that can be reproduced by each of a plurality of preset exposure patterns is accessed. Then, an exposure pattern corresponding to the input density value is selected. When a plurality of exposure patterns are selected for the input density value, the second table indicating the correlation between the dot diameter and output density of each exposure pattern is accessed to derive the dot diameter required for each of the plurality of exposure patterns. Then, an exposure pattern that satisfies the relation of $D/N \leq 0.4$ where D is the derived dot diameter and N is the number of dots present per 1 inch for each of the plurality of exposure patterns is selected. By this series of processes, the graininess can be reduced for the realization of representing favorable gray scale.

Preferably, the exposure pattern has dots scattered and arranged with the distance between adjacent dots set constant in both the main scanning direction and the subscanning direction.

Since the pattern is arranged symmetrically in the vertical and horizontal direction, the patterns can be joined agreeably in the vertical and horizontal direction. It is to be noted that each pattern can be reproduced by magnifying or reducing with a constant scale in the main scanning direction and the subscanning direction. Therefore, by storing just one basic pattern instead of storing all the plurality of patterns in the storage unit, the other patterns can be generated by multiplying by a preset scale rate. Thus the amount to be stored in the storage unit can be reduced.

Preferably, in the case where there a plurality of exposure patterns that satisfy the relationship of $D/N \leq 0.4$, an exposure pattern with the lowest number of dots N present per 1 inch is selected.

Since the exposure pattern with the lowest dot count N is an exposure pattern with the largest required dot diameter, variation in the dot diameter when an exposure pattern is to be formed can be suppressed. Thus, dots can be formed in favorable reproducibility and stably.

Furthermore, the problem of not being able to identify an exposure pattern by an algorithm of selecting a single pattern due to the presence of a plurality of exposure patterns can be obviated.

Preferably, the number of dots N present per 1 inch in the exposure pattern that has the largest distance between adjacent dots among the plurality of prestored exposure patterns satisfies the relation of $75 \leq N \leq 150$.

Thus, the halftone region can be reproduced in further fidelity in the case where the density value is extremely low such as in the range of, for example, 0.1 to 0.3.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–3C are diagrams to describe the exposure pattern.

DESCRIPTION OF THE PREFERRED EMBODIMENTS

An image formation apparatus and image formation method according to an embodiment of the present invention will be described in detail with reference to the drawings.
First Embodiment FIG. 1 is a schematic diagram showing the main structure of an image formation apparatus 1.

Figure 1:
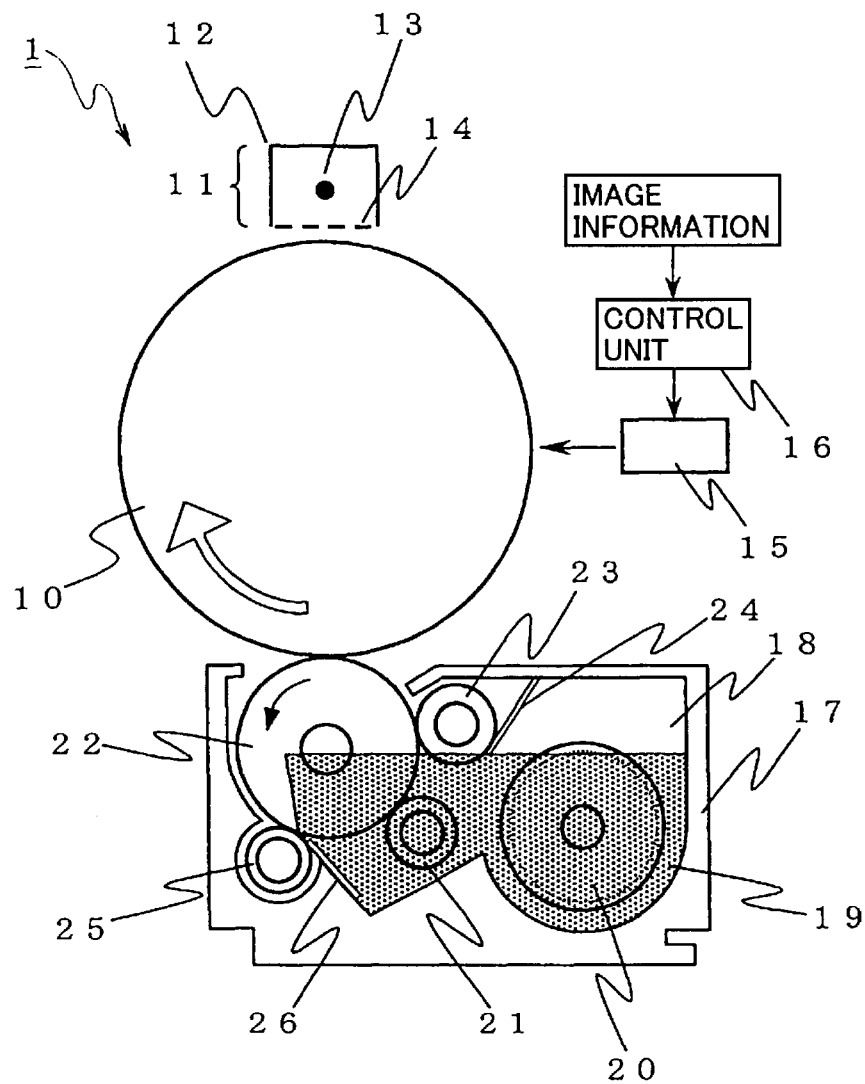
FIG. 1 shows a structure of an image formation apparatus according to an embodiment of the present invention.

Referring to FIG. 1, image formation apparatus 1 includes a photoconductor 1 having a photoconductive film at its surface, a charger unit 11 charging the surface of photoconductor 10 uniformly, an exposure unit 15 exposing the surface of the charged photoconductor 10 to form an electrostatic latent image, a control unit 16 controlling exposure unit 15 based on image information, a development unit 17 (development means) rendering the electrostatic latent image formed at the surface of photoconductor 10 visible by a developer (toner), a transfer unit (not shown) transferring the toner attracted on the surface of photoconductor 10 by the development process onto a recording sheet, and a fix unit (not shown) fixing the transferred toner on the recording sheet.

As to the surface of photoconductor 10 in FIG. 1, an electrostatic latent image is formed at the region between exposure unit 15 and development unit 17, whereas a visuable image will be formed by toner at the region between development unit 17 and the transfer unit (not shown).

Each component will be described hereinafter. Photoconductor 10 has an undercoat layer (UCL layer), a charge generation layer (CGL layer), and a charge transfer layer (CTL layer) sequentially stacked upon the surface of a conductive cylindrical base with aluminum and the like as the raw material. Photoconductor 10 is a stacked type organic photoconductor including a photosensitive layer having the surface charged in negative polarity. The thickness of the photosensitive layer is 15–25 $\mu$m.

Charger unit 11 is formed of a case 12, a wire 13, and a grid 14, each connected to a high voltage power supply. The gap between the surface of photoconductor 10 and charger unit 11 (grid 14) is maintained at approximately 1–2 mm. By controlling the value of the charge emitted from wire 13 by corona charger through the bias voltage applied at grid 14, the surface of photoconductor 10 is charged to a predetermined potential.

In exposure unit 15, the light source is a semiconductor laser of 780 nm in wavelength, driven by control unit 16. Control unit 16 includes a laser driver and a pulse width modulation circuit to adjust the density of the exposure energy emitted from the semiconductor laser.

In the verification experiment, a laser driver made by Melles Griot was employed. This laser driver can provide control to output a constant light power by the APC (Auto Power Control) function, and can adjust the pulse width by an externally applied input.

Development unit 17 employs the contact type development system of non-magnetic one component here. Referring to FIG. 1, the non-magnetic one component toner 19 stored in a toner hopper 18 is conveyed in the proximity of a development roller 22 by means of a mixer screw 20 and a supply roller 21. The conveyed toner 19 is deposited on the surface of development roller 22. The deposited amount thereof is adjusted to a predetermined level by the predetermined set pressure of a doctor roller 23 and set bias voltage.

Development roller 22 on which a predetermined amount of toner 19 is deposited faces photoconductor 10. Development is effected by toner 19 attached electrostatically with respect to the electrostatic latent image formed by exposure unit 15.

Following the development process, the undeveloped toner remaining on development roller 22 is collected by a collect roller 25 to which a bias voltage is applied and then returned to toner hopper 18. The toner on development roller 22 transported to a position facing photoconductor 10 is charged to a polarity identical to that of the surface of photoconductor 10 when charged by the friction with doctor roller 23 at the contacting area. The bias voltage to be applied to development roller 22 is set so that the toner is transferred from development roller 22 to the electrostatic latent image when the potential of the electrostatic latent image formed on photoconductor 10 is between the photoconductor charge potential×½ to 0.

Control unit 16 will be described hereinafter.

Figure 2:
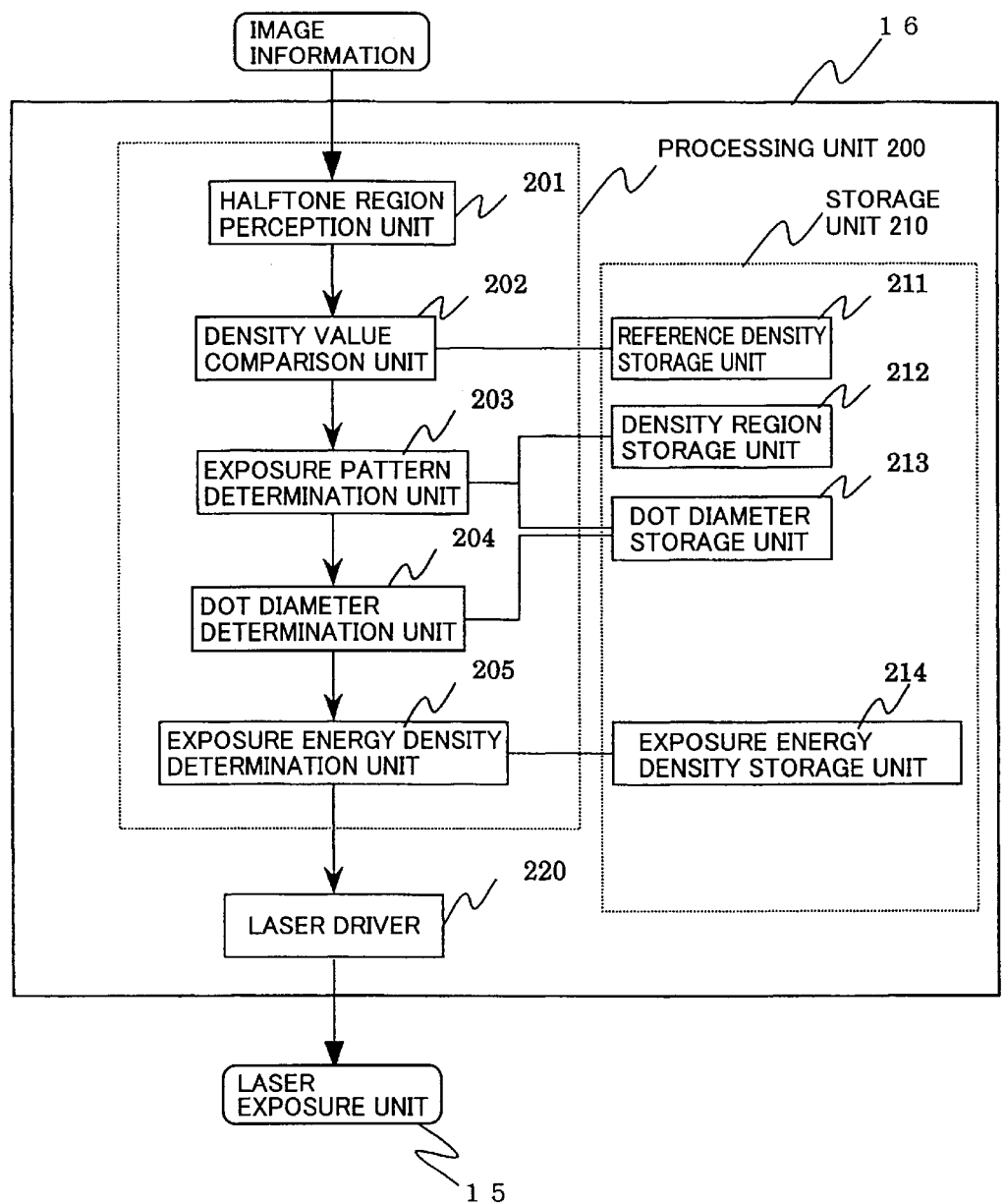
FIG. 2 is a block diagram of the control system of the image formation apparatus according to an embodiment of the present invention.

FIG. 2 shows an example of the control system of control unit 17 in image formation apparatus 1. Referring to FIG. 2, control unit 16 includes a processing unit 200, a storage unit 210, and a laser driver 220.

Processing unit 200 includes a halftone region perception unit 201 perceiving a halftone image region with respect to a plurality of pixels forming image information, a density value comparison unit 202 comparing the density of the perceived pixels at halftone region perception unit 201 with the density stored in a reference density storage unit 211, an exposure pattern determination unit 203 determining an exposure pattern based on the information stored in density region storage unit 212 and a dot diameter storage unit 213, a dot diameter determination unit 204 deriving the dot diameter required in the exposure pattern determined by exposure pattern determination unit 203 based on the information stored in dot diameter storage unit 213, and an exposure energy density determination unit 205 determining the exposure energy required to obtain the dot diameter determined at dot diameter determination unit 204 based on the information stored in exposure energy density storage unit 214.

Storage unit 210 includes reference density storage unit 211 storing the reference density that becomes the subject of processing, density region storage unit 212 storing the density region that can be reproduced by each of a plurality of exposure patterns, dot diameter storage unit 213 storing the dot diameter corresponding to the density of each exposure pattern, and exposure energy density storage unit 214 storing the correlation between the exposure energy and the record dot diameter.

Laser driver 220 drives the laser of a laser exposure unit 15 based on data sent from exposure pattern determination unit 203 and exposure energy density determination unit 205.

In order to adjust the density of the exposure energy of emitted light from the semiconductor laser, the pulse width modulation method that controls the pulse width of the laser drive pulse for every dot with a constant laser intensity is employed. Also, the diameter of the dot formed in the plurality of exposure patterns is regulated. Halftone images of various densities were formed and subjected to quantitative evaluation and sensory evaluation.

FIGS. 3A–3C show three types of exposure patterns employed in the evaluation. In FIGS. 3A–3C, the smallest pixel corresponds to the write resolution of 1200 dpi. Therefore, one pixel has the size of 21.2 $\mu$m×21.2 $\mu$m. Each exposure pattern has dots scattered and arranged with the distance between adjacent dots set constant in both the main scanning direction and the subscanning direction.

By using such exposure patterns, respective patterns can be joined agreeably in the vertical and horizontal direction since they are arranged symmetrically in the vertical and horizontal direction. Each pattern can be reproduced by magnifying or reducing with a constant scale rate in the main scanning direction and subscanning direction. By storing just one basic pattern instead of storing all the patterns in the storage unit, and generating other patterns through multiplying by a preset scale rate, the amount to be stored in the storage unit can be reduced.

The distance between adjacent dots in respective patterns is set to be approximately 339 $\mu$m, approximately 169 $\mu$m, and approximately 85 $\mu$m in the exposure patterns shown in FIGS. 3A, 3B and 3C, respectively. The exposure patterns of FIGS. 3A–3C will be referred to as "exposure pattern 1", "exposure pattern 2" and "exposure pattern 3", respectively.

The number of dots N present per 1 inch is 75 for exposure pattern 1, 150 for exposure pattern 2, and 300 for exposure pattern 3.

Figure 4:
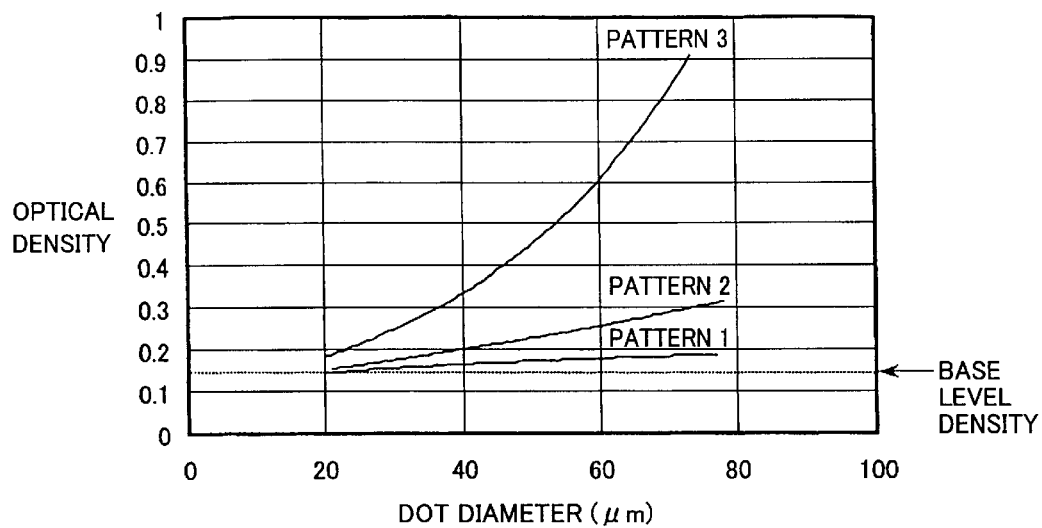
FIG. 4 is a graph representing the changing characteristics of optical density.

FIG. 4 shows the changing property of the optical density when the average dot diameter in each of the exposure patterns of FIGS. 3A–3C is altered. Here, the average dot diameter is the average of measuring the dot diameter of a total of 100 dots, displayed in a magnified manner through a microscope.

The optical density of the output image is measured using Macbeth Densitometer RD-918 (made by Macbeth Corporation). The average of the measured values for a total 5 sites on the same image was taken. The area of measurement by the Macbeth Densitometer is approximately $\phi$1 (cm).

In the currently-employed experiment system, the dot diameter that can be reproduced at respective exposure patterns is approximately 20–75 $\mu$m. The gray scale density region that can be reproduced by the three types of exposure patterns corresponds to the non-printed area with the base level density of 0.15 to the low/middle density region with the optical density of 1.5 and below, indicated by the dotted line.

Specifically, the density region of 0.15 to 0.19 can be represented by exposure pattern 1. The density region of 0.16 to 0.32 can be represented by exposure pattern 2. The density region of 0.19 to 0.91 can be represented by exposure pattern 3.

It is characterized that the plurality of exposure patterns are set so that a certain density can be represented by at least two exposure patterns. For example, the density value of 0.3 can be represented by both exposure pattern 2 and exposure pattern 3.

By the above result, a first table indicating a density region that can be represented for each exposure pattern can be generated, as shown in Table 1, for example, set forth below. This first table is prestored in density region storage unit 212 of control unit 16 in image formation apparatus 1. By referring to this first table, the exposure pattern required to reproduce a desired density can be selected.

TABLE 1

First Table

| Exposure Pattern | Density |
| --- | --- |
| Pattern 1 | 0.15~0.19 |
| Pattern 2 | 0.16~0.32 |
| Pattern 3 | 0.19~0.91 |

When the diameter of the formed dots exceeds a certain value, graininess in the image is exhibited depending upon the number of dots present per 1 inch. This tendency is shown in Table 2. Images of different dot diameters are subjected to sensory evaluation for each pattern with respect to a distance of distinct vision (approximately 30 cm from the output image) and an arbitrary distance.

TABLE 2

Sensory Evaluation of Graininess in Image

| N | $\phi$60 $\mu$m Dot | | $\phi$30 $\mu$m Dot | |
| --- | --- | --- | --- | --- |
| 300 | Distance of Distinct Vision | ○ | Distance of Distinct Vision | ○ |
|  | Arbitrary Distance | ○ | Arbitrary Distance | ○ |
| 150 | Distance of Distinct Vision | ○ | Distance of Distinct Vision | ○ |
|  | Arbitrary Distance | X | Arbitrary Distance | ○ |
| 75 | Distance of Distinct Vision | X | Distance of Distinct Vision | ○ |
|  | Arbitrary Distance | X | Arbitrary Distance | X |

Sign ○: No graininess,
X: Graininess exhibited

It is appreciated from Table 2 that graininess is observed at respective arbitrary distances when the dot diameter is $\phi$30 $\mu$m for exposure pattern 1 of N=75 and when the dot diameter is $\phi$60 $\mu$m for exposure pattern 2 where N=150. Although not shown in the above table, it is confirmed that graininess is observed when the dot diameter becomes $\phi$40 $\mu$m for an exposure pattern where N=100.

Generation of graininess is one factor causing degradation in the picture quality. In other words, reducing graininess is critical in improving the picture quality. Therefore, control was provided to set the dot diameter to $\phi$30 $\mu$m and below for exposure pattern 1 where N=75, to $\phi$40 $\mu$m and below for the exposure pattern where N=100, and to $\phi$60 $\mu$m and below for the exposure pattern where N=150. From these results, it was found that establishing the relationship of D/N≦0.4 where D is the dot diameter is the essential requirement to prevent generation of graininess.

For example, consider the case where a pixel having a density value of 0.3 is to be represented. By first referring to the first table indicated in Table 1, exposure pattern 2 and exposure pattern 3 are selected as the exposure patterns that can represent the pixel of interest. In other words, a plurality of exposure patterns are selected.

The second table (not shown) indicating the correlation between the dot diameter and the output density obtained by the result shown in FIG. 4 is prestored in dot diameter storage unit 213 of control unit 16 in image formation apparatus 1. By referring to this second table, the dot diameter required for each of the selected exposure patterns is derived.

As a result, the dot diameters of 73 µm and 36 µm are obtained for exposure pattern 2 and exposure pattern 3, respectively. In this case, the D/N is 73/150=0.49 for exposure pattern 2 and 36/300=0.12 for exposure pattern 3.

As a result, exposure pattern 3 is selected as the exposure pattern that satisfies the relation of D/N≦0.4 which is the requirement to eliminate graininess in the image. Thus, the exposure pattern to represent a pixel of the density value of 0.3 is determined.

According to the structure of the present embodiment, processing unit 200 implemented by a CPU or the like obtains the density value of a pixel of interest from the image data, which is compared with a predefined density value. When a halftone image region that is below a predetermined density is to be reproduced, the first table in which are stored the density ranges that can be reproduced by each of a plurality of preset exposure patterns is accessed. Such a first table is stored in, for example, a nonvolatile memory. Through this access, processing unit 200 selects an exposure pattern corresponding to the input density value. In the case where a plurality of exposure patterns are selected for the input density value, processing unit 200 accesses the second table that indicates the correlation between the dot diameter and output density of each exposure pattern to derive the dot diameter required for each of the plurality of exposure patterns. Such a second table is likewise stored in, for example, a nonvolatile memory or the like. Processing unit 200 selects an exposure pattern that satisfies the relationship of D/N≦0.4 where D is the derived dot diameter and N is the number of dots present per 1 inch for each of the plurality of exposure patterns.

Since an exposure pattern that satisfies the above relation is selected from exposure patterns that are capable of reproduction, favorable reproducibility can be achieved without graininess in the output image by using an optimum exposure pattern selected by the above algorithm.

It is to be noted that the result obtained by the above processing is also applicable to an ink jet printer that functions to output ink droplets through the drive of a PZT (lead zirconate titanate) or heater, and may be output to a driver that drives the PZT or heater, instead of being output to exposure means such as a laser driver or the like.

The dot diameter can be adjusted by controlling the width of the pulse applied to the PZT or the like. Also, the plurality of exposure patterns are easily applicable by being stored in a nonvolatile memory such as a ROM in the form of a plurality of print patterns.

Second Embodiment

There are cases where the exposure pattern required to obtain a desired density cannot be determined even by the above-described process.

For example, consider the case where a pixel having a density value of 0.25 is to be represented. First, by referring to the first table, exposure patterns 2 and 3 are selected as the exposure pattern that can represent the pixel of interest.

Then, by referring to the second table, the required dot diameter of 56 µm and 30 µm is derived for exposure pattern 2 and exposure pattern 3, respectively. In this case, the D/N is 56/150=0.37 for exposure pattern 2 and 30/300=0.1 for exposure pattern 3. This means that both exposure patterns satisfy the relation of D/N≦0.4. Therefore, an exposure pattern cannot be identified at this time point.

Attention is now focused on the dot stability.

Figure 5:
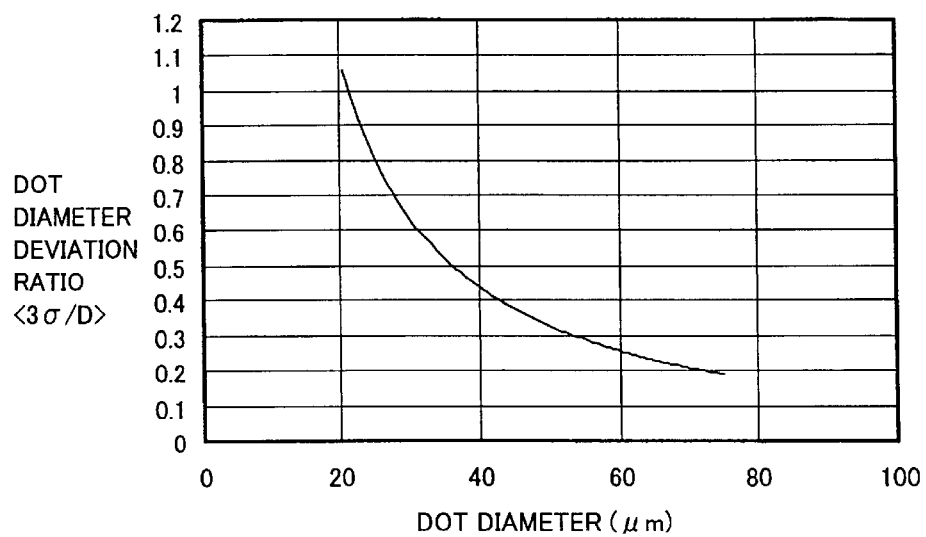
FIG. 5 is a graph representing the level of variation in the dot diameter.

FIG. 5 shows the result of the level of variation in the dot diameter by measuring the diameters of a total of 100 dots. The graph of FIG. 5 has the diameter average D of the formed dots plotted along the abscissas and the dot diameter deviation ratio obtained by (dot diameter distribution deviation width 3σ/D)×(100) plotted along the ordinates.

A smaller dot diameter deviation ratio means that variation in the dot diameter is small, allowing formation of a dot stably. It is apparent from FIG. 5 that variation in the diameter becomes smaller as the average dot diameter D becomes larger. It is therefore expected that, by increasing the diameter of dots forming the image, the image reproducibility can be improved with respect to a halftone image formed of a cluster of dots.

Taking this feature into account, exposure pattern 2 having a larger required dot diameter is selected from the aforementioned exposure patterns 2 and 3 corresponding to the dot diameter of 56 µm and 30 µm, respectively. Thus, the exposure pattern to represent a pixel having a density value of 0.25 is determined.

In the case where pixels of the same density are to be reproduced, the required dot diameter is inevitably larger for an exposure pattern that has a larger distance between adjacent dots, assuming that the area ratio of the black portion to the entire pixels is constant.

Thus, it can be said that an exposure pattern with a large required dot diameter is an exposure pattern with a large distance between adjacent dots, i.e. with the lowest number of dots N present per 1 inch.

Figure 6:
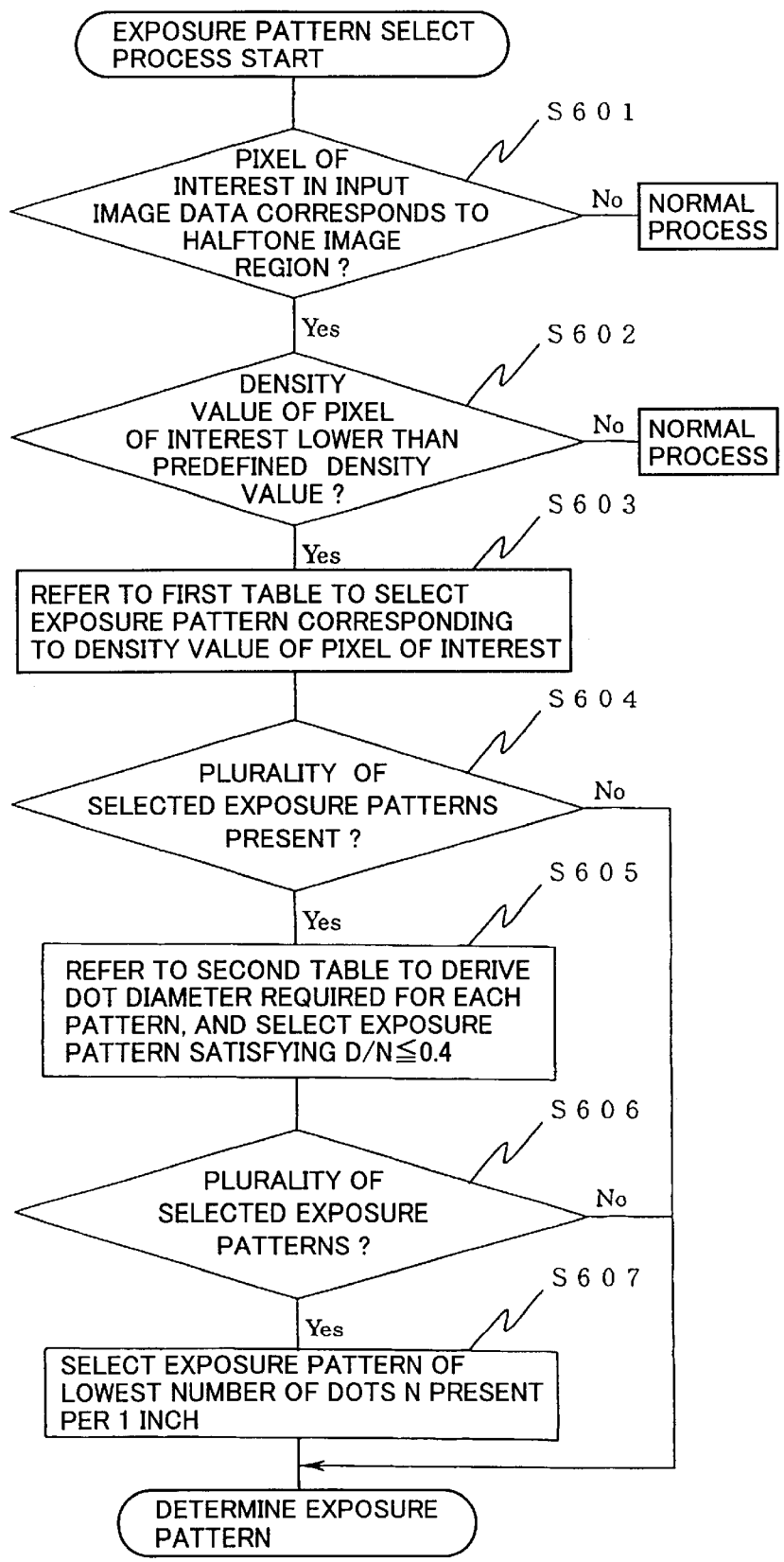
FIG. 6 is a flow chart of the series of procedure to determine the exposure pattern.

FIG. 6 is a flow chart of the series of procedures of the above-described exposure pattern determination process. The present process is mainly executed at exposure pattern determination unit 203 of control unit 16 in image formation apparatus 1.

At step S601, determination is made whether the pixel of interest in the input image information is a pixel forming a halftone image region. Step S601 is executed at halftone region perception unit 201 in control unit 16 of image formation apparatus 1.

When the determination result indicates that the pixel of interest does not correspond to a halftone image region, a normal process is conducted. If the pixel of interest corresponds to a halftone image region, control proceeds to S602 where determination is made whether the density value of the pixel of interest is lower than a predefined density value stored in reference density storage unit 211 of control unit 16 in image formation apparatus 1. Step S602 is executed at density value comparison unit 202 of control unit 16 in image formation apparatus 1.

In the case where the density of the pixel of interest is higher than the predefined density value, it is envisaged that the general halftone process such as the clustered-dot type or dispersed-dot type is conducted. When the density is lower than the predefined density, control proceeds to step S603 to select the exposure pattern corresponding to the density value of the pixel of interest by referring to the first table storing the density range that can be reproduced by respective exposure patterns in density region storage unit 212 of control unit 16 in image formation apparatus 1.

At step S604, the selected exposure pattern is ascertained when there is only one selected exposure pattern. In the case where there are a plurality of patterns selected, control proceeds to step S605. By referring to the second table indicating the correlation between the dot diameter and the output density for respective exposure patterns stored in dot diameter storage unit 213 of control unit 16 in image formation apparatus 1, the dot diameter required to form a pixel having a desired density level is derived for each of the selected exposure patterns. Then, the exposure pattern that satisfies the relationship of $D/N \leq 0.4$ where D is the derived dot diameter and N is the number of dots present per 1 inch in respective exposure patterns is selected.

At step S606, the selected exposure pattern is ascertained if there is only one exposure pattern selected. In the case where there are a plurality of exposure patterns selected, control proceeds to step S607 to select the exposure pattern with the smallest dot count N present per 1 inch from the plurality of selected exposure patterns.

By the above series of processing, an exposure pattern to be applied in reproducing a pixel that has a density below a predetermined value is determined.

In the case where there are a plurality of exposure patterns satisfying the relation of $D/N \leq 0.4$, processing unit 200 selects an exposure pattern with the lowest dot count N. Since such a selected exposure pattern corresponds to a large required dot diameter, variation in the dot diameter can be suppressed to a low level when forming the exposure pattern. Therefore, dots can be formed in favorable reproducibility and stably.

The problem of not being able to identify an appropriate exposure pattern by an algorithm that selects a single pattern due to the presence of a plurality of exposure patterns can be obviated.

Then, a study was conducted as to what exposure pattern is optimum to be used for reproduction of a halftone region having an extremely low density. Exposure pattern 1 where N=75 and exposure pattern 2 where N=150, shown in FIG. 4, were taken as the subject patterns. In the case where exposure pattern 1 is employed, the average dot diameter D must be suppressed to $\phi 30 \mu m$ and below in order to satisfy the relationship of $D/N \leq 0.4$ which is the requirement to suppress graininess in the output image.

In this case, the density range that can be substantially reproduced by exposure pattern 1 is as small as 0.15–0.16, which is not effective. Therefore, it is preferable to set the number of dots present per 1 inch to $N \geq 75$.

In the case where exposure pattern 2 is employed, the average dot diameter D must be suppressed to be $\phi 60 \mu m$ and below in order to satisfy the relationship of $D/N \leq 0.4$ which is the requirement to suppress graininess in the output image. In this case, the density range that can be substantially reproduced by exposure pattern 2 is enlarged to 0.16–0.26. It can be said that this exposure pattern is more suitable to be used in reproducing a halftone image of extremely low density.

However, it is to be noted that when an halftone image of not more than 0.2 in optical density is required, the dot diameter must be $\phi 40 \mu m$ and below, as apparent from FIG. 4. A region of an extremely great dot diameter deviation ratio must be used, referring to FIG. 5. This is not desirable from the standpoint of maintaining the image reproducibility at a high level. In other words, usage of a pattern with a larger required dot diameter is desirable in order to improve the image reproducibility.

Therefore, in reproducing a low density region of the same density level, it is preferable to use an exposure pattern with a larger required dot diameter, i.e. an exposure pattern satisfying the lower dot count of $N \leq 150$.

In view of the foregoing, the exposure pattern corresponding to the largest distance between adjacent dots, applicable to reproduce a halftone region of an extremely low density, preferably satisfies $75 \leq N \leq 150$ where N is the number of dots present per 1 inch.

By using such an exposure pattern, a halftone image of more favorable reproducibility with graininess suppressed can be formed for an image region of extremely low density such as in the range of, for example 0.1 to 0.3.

The procedure of deriving an exposure pattern that is required to form a pixel of the desired density using the exposure pattern determined at exposure pattern determination unit 203 will be described hereinafter.

Figure 7:
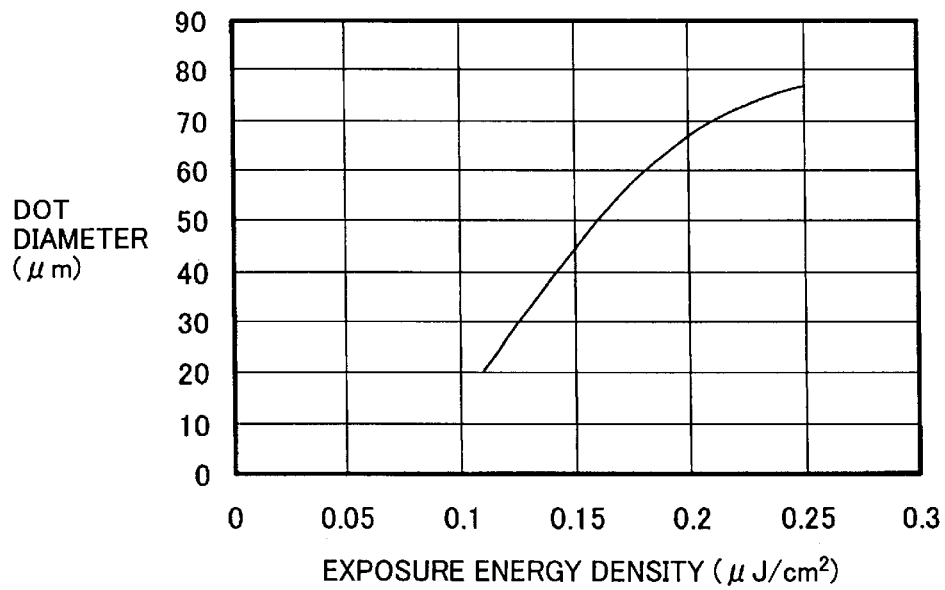
FIG. 7 is a graph indicating the correlation between the exposure energy density and dot diameter.

FIG. 7 is a graph showing an example of correlation between the exposure energy density and dot diameter.

Based on the graph of FIG. 7, a third table (not shown) indicating the correlation between the exposure energy and dot diameter is produced and prestored in exposure energy density storage unit 214 of control unit 16 in image formation apparatus 1.

Figure 8:
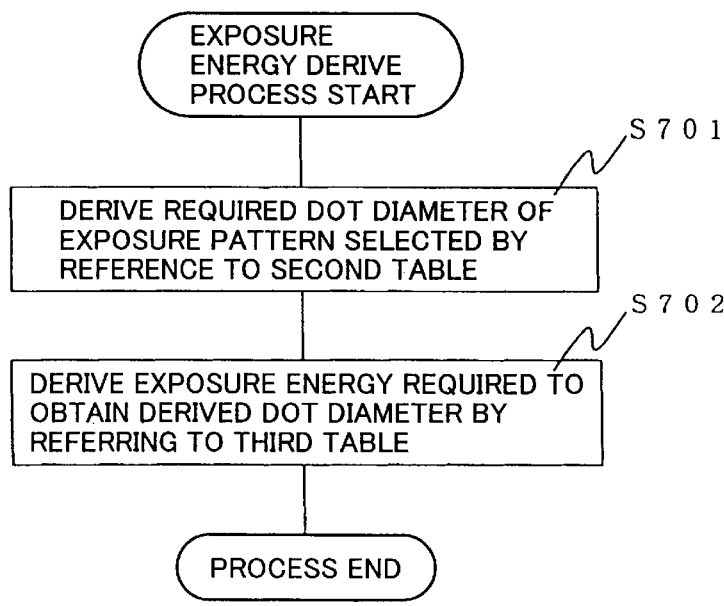
FIG. 8 is a flow chart to describe the exposure energy calculation process.

FIG. 8 is a flow chart of the procedure of deriving exposure energy density executed at exposure energy density determination unit 205 in control unit 16 of image formation apparatus 1.

At step S701, the dot diameter required to obtain the desired density for the exposure pattern selected by the process indicated by the flow chart of FIG. 6 is derived by referring to the second table indicating the correlation between the dot diameter and output density of each exposure pattern. In the case where the process of step S605 is already effected in the series of procedures of FIG. 6, the present process (S701) is not required.

At step S702, exposure energy density determination unit 205 derives the exposure energy required to obtain the dot diameter derived at step S701 or S605 by referring to the third table.

The ascertained optimum exposure pattern and exposure energy corresponding to an image density are transmitted from exposure energy density determination unit 205 to laser driver 220. Laser driver 220 controls laser exposure unit 15 based on the transmitted optimum exposure pattern and exposure energy to allow formation of a halftone image maintaining superior image reproducibility without generation of graininess.

By controlling the exposure energy quantitatively based on the second table storing the correlation between the dot diameter and output density for each of the plurality of exposure patterns and the third table storing the correlation between the exposure energy and dot diameter, the desired density can be reproduced at high accuracy by any of the exposure patterns. Also, by supplying the drive pulse having the pulse width controlled according to the required exposure energy density to the light source, the light source can be driven at a drive energy optimal to dots forming a halftone image. Since the optimum exposure energy with respect to the dots can be applied, favorable dot reproducibility can be achieved.

Although a latent image is formed by exposure on a photoconductor in the present embodiment, other latent image formation methods can be employed instead.

A pulse width modulation system controlling the width of the laser drive pulse for each dot has been employed as the exposure energy modulation system with the laser intensity set constant. Additionally, an intensity modulation system controlling the input energy for each dot with the pulse width set constant may be applied. Alternatively, an exposure energy control system corresponding to a combination of pulse width modulation and intensity modulation may be applied. In the structure employing the intensity modulation function, the light source can be driven at a drive energy optimal to dots forming a halftone image by supplying a drive pulse having the input energy controlled according to the required exposure energy density to the light source. Since an exposure energy optimal to the dot can be applied, favorable dot reproducibility can be achieved.

The present embodiment has been described based on results by an image formation apparatus of a one component contact development system using an organic photoreceptor as the photoconductor. The present invention is also applicable to an image formation apparatus such as of the two-component development system and jumping development system, as well as to an image formation apparatus that uses an inorganic photoreceptor.

Furthermore, the present invention is not limited to the above-described image formation apparatus of the electrophotographic system, and is also applicable to an ink jet type image formation apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
    an exposure unit conducting laser exposure on a photoconductor charged to a predetermined potential at a predetermined polarity to form an electrostatic latent image;
    a development unit applying a developer electrostatically to said electrostatic latent image for visualization;
    a storage unit prestoring a plurality of exposure patterns having dots scattered and arranged with a distance between adjacent dots set constant in both a main scanning direction and a sub scanning direction, a first table in which are stored density ranges that can be reproduced by respective exposure patterns and a second table in which are stored a correlation between a dot diameter and an output density of each exposure pattern; and
    a processing unit controlling said exposure unit in reproducing a halftone image region below a predetermined density, wherein said processing unit, in an operation of reproducing said halftone image region below a predetermined density,
        i) selects an exposure pattern corresponding to an input density value by referring to said first table,
        ii) when a plurality of exposure patterns are selected corresponding to said input density value, derives a dot diameter required for each of said plurality of exposure patterns by referring to said second table, and selecting an exposure pattern satisfying a relation of $D/N \leq 0.4$ where D is said dot diameter and N is the number of dots present per 1 inch in each of said plurality of exposure patterns, and
        iii) uses said selected exposure pattern to control said exposure unit.

2. The image formation apparatus according to claim 1, wherein said processing unit further carries out a process of selecting an exposure pattern with the lowest number of dots N present per 1 inch when there are a plurality of exposure patterns satisfying said relation.

3. The image formation apparatus according to claim 1, wherein said number of dots N present per 1 inch for an exposure pattern having the largest distance between adjacent dots among said plurality of exposure patterns satisfies $75 \leq N \leq 150$.

4. The image formation apparatus according to claim 1, said image formation apparatus effecting gray scale rendition by a combination of said exposure pattern and dot diameter control by exposure energy modulation, wherein
    said storage unit prestores a third table indicating a correlation between exposure energy and dot diameter in advance,
    said processing unit derives a required dot diameter corresponding to the determined exposure pattern by referring to said second table for an image density of each pixel forming said halftone image region, and includes an exposure energy density determination unit deriving an exposure energy required to obtain said derived dot diameter by referring to said third table,
    said image formation apparatus further comprising a laser driver controlling said exposure unit based on said determined exposure pattern and said exposure energy to effect exposure so as to obtain a desired output density.

5. The image formation apparatus according to claim 4, wherein said exposure energy modulation is a pulse width modulation controlling a width of a laser drive pulse for each dot.

6. The image formation apparatus according to claim 4, wherein said exposure energy modulation is an intensity modulation controlling an input energy for each dot.

7. An image formation method of effecting gray scale rendition, comprising the steps of:
    obtaining a density value of a pixel of interest,
    comparing said density value with a predefined density value,
    selecting an exposure pattern with respect to an input density value by referring to a first table storing a density range that can be reproduced by each of a plurality of preset exposure patterns in reproducing a halftone image region that is below a predetermined density,
    when a plurality of exposure patterns are selected for said input density value, deriving a dot diameter required for each of said plurality of exposure patterns by referring to a second table indicating a correlation between a dot diameter and an output density of respective exposure patterns, and
    selecting an exposure pattern satisfying $D/N \leq 0.4$ where D is said derived dot diameter and N is the number of dots present per 1 inch in each of said plurality of exposure patterns.

8. The image formation method according to claim 7, wherein said exposure pattern has dots scattered and arranged with a distance between adjacent dot set constant in both a main scanning direction and a subscanning direction.

9. The image formation method according to claim 7, further comprising the step of selecting, when there are a plurality of said exposure patterns satisfying $D/N \leq 0.4$, an exposure pattern having the lowest number of dots N present per 1 inch.

10. The image formation method according to claim 7, wherein said number of dots N present per 1 inch satisfies $75 \leq N \leq 150$ in an exposure pattern having the largest distance between adjacent dots among said prestored plurality of exposure patterns.

* * * * *